Sept. 14, 1943.          M. HATTAN ET AL          2,329,198
                    END FITTING FOR FLEXIBLE HOSE
                        Filed Dec. 12, 1941

INVENTORS
MARK HATTAN
GEORGE F. SCHAUER
ATTORNEYS

UNITED STATES PATENT OFFICE 2,329,198

END FITTING FOR FLEXIBLE HOSE

Mark Hattan, Dayton, and George F. Schauer, Osborn, Ohio

Application December 12, 1941, Serial No. 422,696

3 Claims. (Cl. 285—84)

(Granted under the act of March 3, 1883, as amended April 30, 1928; 370 O. G. 757)

The invention described herein may be manufactured and used by or for Government for governmental purposes, without the payment to us of any royalty thereon.

This invention relates generally to end fittings for flexible hose and is particularly advantageous when applied to high pressure hose.

An object of the invention is to devise a fitting of this kind wherein the parts are few in number, of simple and strong design, and substantially incapable of getting out of order.

Another object of the invention is to provide an end fitting for a hose in which the minimum inside diameter of the fitting is no smaller than the inside diameter of the hose, to the end that the flow capacity of the assembly will not be reduced by the end fitting.

Hose made of rubber, synthetic or natural, generally comprises an outer and an inner layer of the rubber with a sleeve of woven fabric or braided wire between them, cotton fabric being generally used for moderate pressures, but braided wire for higher pressures, and while the rubber layers are, of course, yieldable, the fabric and particularly the braided wire layers may not be expanded or reduced in diameter appreciably without definite injury. It follows that where the inner member of an end fitting has a tubular portion which has an opening therethrough as large as the inside of the hose, the outer diameter of the tube will necessarily be so much larger than the hole in the hose that the fabric layer or braided wire sleeve is expanded to its injury by insertion of the tube.

It is therefore another object of the invention to so construct and arrange the several parts of the fitting, and so assemble the parts with the hose, that while considerable pressure is applied to the inner rubber layer outwardly, which would normally expand a braided wire reinforcing sleeve to a larger diameter, an equal pressure is simultaneously applied to the outer rubber layer inwardly whereby the fitting is assembled and the rubber layers considerably reduced in thickness without any alteration in the diameter of the braided wire layer.

In a two piece end fitting of the class to which this improvement appertains, the tubular part which fits into the hole in the hose and the sleeve which fits over the outside, are preferably respectively screwed into and onto the hose, and, to minimize the force with which the hose must be gripped to hold it against this turning effort, the inner and outer fitting members are threaded, one right and the other left, whereby the respective torques necessary to screw them into place are opposite.

It is therefore another object of this invention to so proportion the several parts of the device that the opposite torques above referred to will be substantially equal and the necessary grip on the hose to prevent its turning therefore substantially zero.

Since the grip of the fitting members on the hose end, and the reduction in wall thickness incident to such grip is accomplished by screwing the members one into and the other over the hose end, some means must be provided to insure that the threads will not scuff the hose and that any part of the outer surface of the hose will be pressed inward at the same time that a corresponding inner surface will be pressed outward.

It is therefore another object of the invention to make a small portion of both the internal and external threads at their starting ends tapered with the tapered part of both threads of equal length, then provide means at the opposite end which will assist the assembler in advancing the two fitting parts uniformly by disclosing when the outer member is being screwed on faster than the inner, whereby the tapered portions will be kept the one opposite the other.

Where, as in the two piece end fitting herein shown, both fitting parts are threaded, and both have cut their own threads into the hose, it has been observed that when the fitting members are shouldered, one against the other, and when one is rotated to advance it axially on the hose and it pushes the second axially without rotation of the second, the threads of the second are forced away from the one side of its threads in the hose to an extent which tends to leakage.

It is therefore another object of the invention to provide a locking means whereby, when each member is drawn up on the hose to its proper position, the two members may be locked one to the other, whereby neither member may be advanced by rotation and carry the other member axially without rotation.

Other objects and advantages will become apparent as the following description is read with reference to the drawing, wherein, Fig. 1 shows the improved end fitting assembled on the end of a section of hose, part being broken away and shown in section.

Like reference characters refer to like parts throughout the several views of the drawing.

Figure 3:
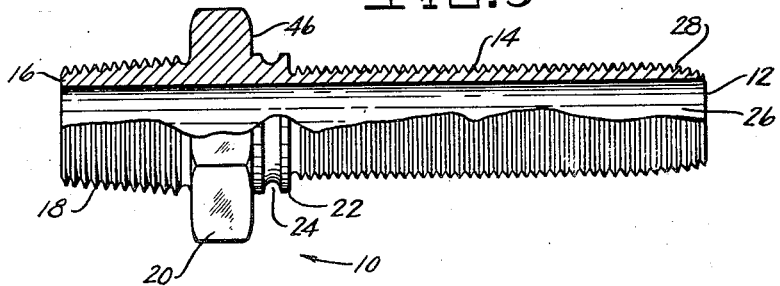
Fig. 3 shows the inner member which carries the tubular portion which screws into the hole of the hose, part being broken away and shown in section.

In the drawing, a main fitting member 10, shown in detail in Fig. 3, at one end has a tubular portion 12 threaded exteriorly as at 14. The other end is provided with a tapered portion 16 externally threaded at 18. A polygonal portion 20 intermediate the threaded ends is provided for screwing the end 12 into a section of hose or the end 16 into a correspondingly threaded part for completing a hose connection. A hub 22 carries a locking screw groove 24. The hole 26 through the member 10 is of substantially the size of the hole in the hose. The end 16 may, of course, be provided with internal threads, or it may be otherwise varied to suit the connections to which it is to attach. At the outer end, the threads 14 on the tubular portion 12 are tapered as at 28, this taper being no longer than necessary to enable the tubular part 12 to force its way into the hose without scuffing or tearing it.

Figure 2:
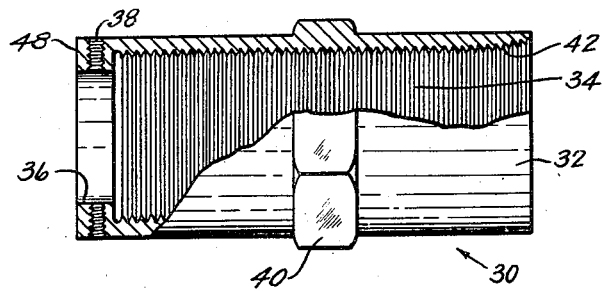
Fig. 2 shows the outer member or sleeve which screws over the outside of the hose, part being broken away and shown in section.

The second fitting member 30, shown in detail in Fig. 2, is in the form of a sleeve 32, internally threaded at 34 for the greater part of its length but reduced to a smaller diameter at 36, this part being smooth bored and of proper diameter to rotate freely on the hub 22 of the member 10. Tapped holes 38 are axially positioned to align with the groove 24 of the member 10. A polygonal portion 40 is provided for screwing the sleeve 30 over the outside of the hose. At the outer end the threads 34 are tapered as at 42. The length of the tapered part 42 of the internal threads should correspond as nearly as possible with the length of the tapered part 28 of the threads 14 on the member 10.

Figure 1:
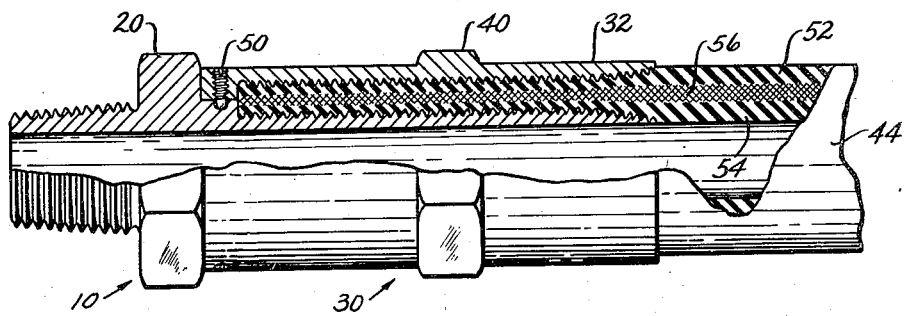

In assembling the fitting members 10 and 30 with a length of hose 44, as shown in Fig. 1, the hose may preferably be held lightly in a vise with a short length of rod of the diameter of the hole in the hose inserted therein at the point where the vise clamps it. The tapered threads 42 of the member 30 (see Fig. 2) may then be slightly started onto the end of the hose, and the tapered threads 28 of the member 10 (see Fig. 3) similarly started into the end until the shoulder 46 of the member 10, Fig. 3, almost, but not quite, touches the end 48 of the member 30, Fig. 2.

The fitting members may now be screwed into and onto the hose by turning the one clockwise and the other anticlockwise, preferably always maintaining a very slight space between the shoulder 46 and the end 48 until the two fitting members are completely on the hose, after which the turning of the fittings is so controlled that the shoulders 46 and 48 are brought together until they just touch and the lock screws 50 are tightened as in Fig. 1.

By encircling the collar 22 with a groove 24 instead of by a series of circumferentially spaced holes, the screws 50 may be set at the exact point where the shoulders 46 and 48 come together. This is important for if the two fitting members 10 and 30 must be further rotated with respect to each other after the shoulders 46 and 48 touch, there is danger that one of the two members may push the other axially without rotation, which tends to unseat the metal threads in their rubber counterparts and cause leakage.

From the assembly Fig. 1 it may be observed that the hose 44 comprises an outer rubber layer 52, an inner rubber layer 54 and a reinforcing sleeve of braided piano wire 56 intermediate the rubber layers, and because of the manner of assembly of the several parts, the layer 52 is compressed inwardly, the layer 54 outwardly, while the braided wire sleeve 56, although slightly condensed, has not changed its mean diameter.

This is important and a result obtained by the structure of the several parts, and by the manner of their assembly, for had, for instance, the outer member 30 preceded the inner member 10 onto and into the hose by any considerable amount, the tapered end 42 of the threads 34 going ahead would have so distorted the braided wire sleeve 56, that the tapered ends 28 of the threads 14, following after, could not possibly have entered the inside of the hose without shearing away some of the inner rubber layer 54.

Similarly, if the structure were so made that the member 10 could precede the member 30 in the assembly, the braided wire layer would have been so deformed outwardly by the tapered threads 28 that the tapered threads 42 could not thereafter have forced their way over the layer 52 without shearing some of it away.

While the details of structure herein shown are more or less specific, it will be obvious that there are many equivalents which would come within the spirit of the invention, as for instance, instead of the locking screw 50, a spring actuated plunger may be employed, and instead of the polygonal wrench applying means 20, 40, provision may be made for a spanner wrench or other means for turning the fitting parts.

Having described an embodiment of the invention, we claim:

1. An end fitting for a section of hose comprising an inner tubular member having an externally threaded portion and an outer sleeve member having an internally threaded portion, said portions being: oppositely threaded; of equal length; of substantially cylindrical contour throughout the major portion of their lengths; and divergently tapered at their outer or starting ends; whereby said end fitting may be assembled by threadedly engaging said hose and members and rotating said members in opposite directions until the hose and members are in threaded engagement for substantially the lengths of the threaded portions of the members.

2. A device, as recited in claim 1, and further including a locking screw in one of said members and a groove in the other of said members for locking said members together when assembled.

3. A device, as recited in claim 1, in which said members are provided with internal shoulder portions for engaging the end of said hose when assembled, and external shoulder portions to function as indicating means for maintaining equal advance of said members on said hose.

MARK HATTAN.
GEORGE F. SCHAUER.